United States Patent
Hsu et al.

(10) Patent No.: US 11,061,694 B2
(45) Date of Patent: Jul. 13, 2021

(54) RECONFIGURABLE DATA BUS SYSTEM AND METHOD THEREOF

(71) Applicant: INDUSTRIAL TECHNOLOGY RESEARCH INSTITUTE, Hsinchu (TW)

(72) Inventors: Chien-Min Hsu, Hsinchu County (TW); Shih-Hsien Wu, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/677,301

(22) Filed: Nov. 7, 2019

(65) Prior Publication Data
US 2020/0142713 A1 May 7, 2020

Related U.S. Application Data

(60) Provisional application No. 62/756,828, filed on Nov. 7, 2018.

(51) Int. Cl.
*G06F 9/445* (2018.01)
*G06N 3/08* (2006.01)
(Continued)

(52) U.S. Cl.
CPC .......... *G06F 9/44505* (2013.01); *G06F 13/20* (2013.01); *G06N 3/04* (2013.01); *G06N 3/08* (2013.01)

(58) Field of Classification Search
CPC ........ G06F 13/00; G01R 1/0416; H01L 23/48
See application file for complete search history.

(56) References Cited

U.S. PATENT DOCUMENTS 4,032,893 A 6/1977 Moran
6,243,776 B1 * 6/2001 Lattimore ........... G06F 13/4072
710/104

(Continued)

FOREIGN PATENT DOCUMENTS

CN 102483721 A 5/2012
EP 1652097 B1 2/2008
(Continued)

OTHER PUBLICATIONS

TW Notice of Allowance in Application No. 108140421 dated Sep. 21, 2020.

*Primary Examiner* — Getente A Yimer
(74) *Attorney, Agent, or Firm* — Maschoff Brennan

(57) ABSTRACT

A reconfigurable data bus system comprises a driver, a receiver, a data bus and a detector. The driver stores an electrical parameter data base. The electrical parameter data base includes a plurality of different signal-to-ground ratios and a plurality of signal quality parameters corresponding to the signal-to-ground ratios. The data bus includes a plurality of signal lines electrically connected between the driver and the receiver. The detector is electrically connected to the data bus and the driver. The detector is configured to detect a current signal quality parameter of the data bus and transmit the current signal quality parameter to the driver. The driver is selectively reconfigured a current signal-to-ground ratio according to a current signal quality parameter of the data bus and the electrical parameter database.

18 Claims, 10 Drawing Sheets

(51) Int. Cl.
*G06N 3/04* (2006.01)
*G06F 13/20* (2006.01)
*G06N 3/063* (2006.01)
*G06F 13/40* (2006.01)

(56) References Cited

U.S. PATENT DOCUMENTS

| | | | |
|---|---|---|---|
| 2002/0089322 A1* | 7/2002 | Frame | G01R 1/0416 324/756.05 |
| 2004/0174807 A1 | 9/2004 | Li | |
| 2011/0026519 A1 | 2/2011 | Sullam et al. | |
| 2011/0299317 A1* | 12/2011 | Shaeffer | G11C 13/0035 365/106 |
| 2013/0177106 A1* | 7/2013 | Levesque | H03F 3/195 375/297 |
| 2016/0371157 A1* | 12/2016 | Mishra | G06F 1/3296 |
| 2017/0047925 A1* | 2/2017 | Katare | H03K 19/018521 |

FOREIGN PATENT DOCUMENTS

| | | |
|---|---|---|
| TW | 589541 B | 6/2004 |
| TW | 201502791 A | 1/2015 |
| WO | 2012/112618 A1 | 8/2012 |
| WO | 2014/105173 A1 | 7/2014 |

* cited by examiner

RECONFIGURABLE DATA BUS SYSTEM AND METHOD THEREOF

CROSS-REFERENCE TO RELATED APPLICATIONS

This non-provisional application claims priority under 35 U.S.C. § 119(a) on Patent Application No. 62/756,828 filed in United States of America on Nov. 7, 2018, the entire contents of which are hereby incorporated by reference.

BACKGROUND

1. Technical Field

This disclosure relates to a data bus system that is capable of automatically reconfiguring the signal line layout and a method thereof

2. Related Art

Whenever the old and the new hardware specifications alternate, there will always be transitional products on the market. For example, a board that has both ultra-fast transfer rate (SDR) and double transfer rate (DDR) memory specifications. However, when two different specifications of hardware are laid out on a same circuit board, the layout of the data bus between two hardware must be designed without increasing the excessive cost, so as to effectively solve the crosstalk effect.

In order to reduce the crosstalk effect between adjacent signal lines, a grounding conductor is usually added between adjacent signal lines. However, when the ground wire is added to the vicinity of the signal line, the maximum bandwidth of the data bus is limited. Therefore, when the demand specification changes, the number of grounding conductors must be changed again, which is very inconvenient and time-consuming in design.

At present, most of the trial and error methods are used to design the layout of the data bus between two hardware. The engineer judges whether the signal quality of the data bus and the data transmission rate meet the requirements specifications. When the requirements are not met, the engineer uses the experience to modify the layout of the data bus, such as shortening the length of the signal line or increasing the number of signal lines until the signal quality and data transmission rate meet the required specifications.

SUMMARY

Accordingly, the present invention provides a reconfigurable data bus system and a method of reconfiguring a data bus, without changing the number of signal lines of the data bus, and the number of signal lines for transmitting low voltage-level signals in the data bus and the number of signal lines for transmitting data can be automatically reconfigured, thereby reducing the crosstalk effect between adjacent signal lines.

One embodiment of the present invention provides a reconfigurable data bus system, comprising: a driver, storing an electrical parameter database, the electrical parameter database includes a plurality of different signal-to-ground ratios and a plurality of signal quality parameters corresponding to the plurality of different signal-to-ground ratios; a receiver; a data bus, including a plurality of signal lines electrically connected between the driver and the receiver; and a detector, electrically connected to the data bus and the driver, and the detector is configured to detect a current signal quality parameter of the data bus and transmit the current signal quality parameter to the driver; the driver is selectively reconfigured a current signal-to-ground ratio of the data bus according to the current signal quality parameter and the electrical parameter database.

One embodiment of the present invention provides a method of reconfiguring a data bus, wherein the data bus is connected between a driver and a receiver, and the method of reconfiguring the data bus comprises: storing an electrical parameter database in the driver, wherein the electrical parameter database comprises a plurality of different signal-to-ground ratios and a plurality of signal quality parameters corresponding to the plurality of signal-to-ground ratios; detecting a current signal quality parameter of the data bus by a detector; and reconfiguring selectively a current signal-to-ground ratio of the data bus by the driver according to the current signal quality parameter and the electrical parameter database.

According to different required specifications, the reconfigurable data bus system and the method thereof disclosed in the present invention, which may automatically adjust the ratio of the number of signal lines for transmitting the low voltage level signal in the data bus and the number of signal lines for transmitting data, not only reduce the crosstalk effect between adjacent signal lines, but also do not require changes to the hardware circuit. As a result, it is more flexible and reducing the time that takes to design, and achieves greater data transfer rates and better signal quality.

The above descriptions of the present disclosure and the following descriptions of the embodiments of the present disclosure are intended to illustrate and explain the spirit and principles of the disclosure and provide a further explanation of the scope of the claims of the disclosure.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
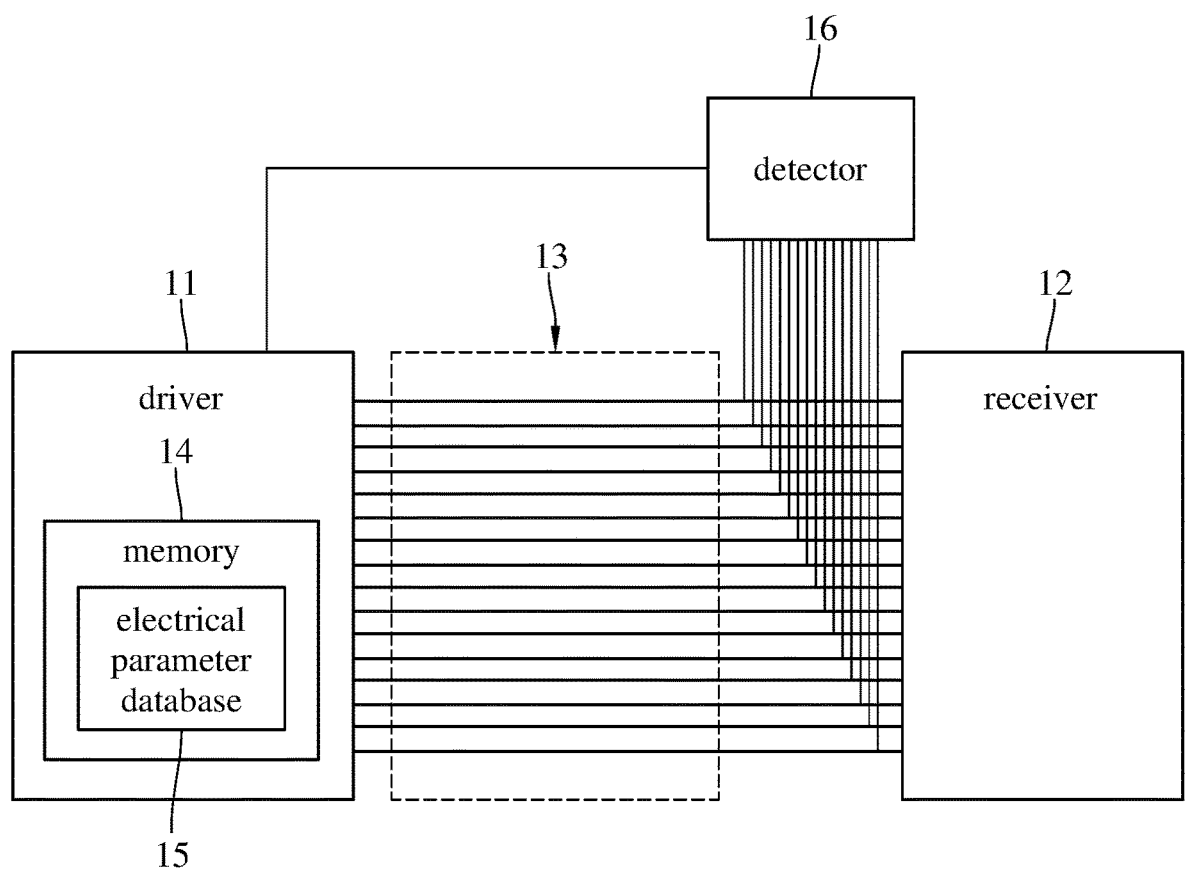
FIG. 1 is a functional block diagram of the reconfigurable data bus system according to a first embodiment of the present invention.

FIG. 1 is a functional block diagram of a reconfigurable data bus system according to a first embodiment of the present invention. Referring to FIG. 1, the reconfigurable data bus system includes a driver 11, a receiver 12 and a data bus 13. The driver 11 and the receiver 12 are respectively a central processing unit and a memory, or the graphics processor and the memory, respectively. The driver 11, the receiver 12 and the data bus 13 are disposed on a circuit board. The data bus 13 includes a plurality of signal lines electrically connected between the driver 11 and the receiver 12.

A memory 14 is disposed in the driver 11. The memory 14 stores an electrical parameter database 15. The memory 14 is, for example, a non-volatile memory, and the electrical parameter database 15 includes a plurality of different types of electrical parameters. For example, the type of the electrical parameter may be, but not limited to a signal-to-ground ratio, an operating voltage, a signal line length, and a signal quality parameter. The signal quality parameter includes, for example, a data rate, an eye height, a bit error rate, a jitter, a rising time, a falling time, and an overshoot/undershoot, but not be limited to this. The signal-to-ground ratio is defined as the ratio of the number of signal lines used to transmit data in the data bus 13 to the number of signal lines used to transmit low voltage levels. For example, when the driver 11 sets all the signal lines for transmitting data, the signal-to-ground ratio is zero. When the driver 11 sets a signal line for transmitting a low voltage level signal between every two signal lines for transmitting data, the signal-to-ground ratio is 1. When two signal lines for transmitting a low voltage level signal are arranged between every two signal lines for transmitting data, the signal-to-ground ratio is 1/2. In addition, each of the electrical parameters of the electrical parameter database 15 includes a plurality of different values. For example, a plurality of values of signal-to-ground ratios may be, but not limited to 0, 1, and 1/2. The plurality of values of the data transmission rate may be a plurality of equal points within a range of the data transmission rate.

The reconfigurable data bus system further includes a detector 16 electrically connected to all signal lines of the data bus 13 and the driver 11. The detector 16 is configured to detect the signal quality parameter of the signal currently transmitted on each signal line of the data bus 13. Since the detector 16 and the signal lines respectively have different connection positions, the signal quality parameter detected on the signal line closest to the receiver 12 among the connection positions is generally regarded as the current signal quality parameter.

To facilitate the interpretation of the electrical parameter database 15, Table 1 below shows a portion of the electrical parameter database 15.

TABLE 1

| Data transmission rate = 2.4 Gbps, Operating voltage = 400 mV Length of the signal line = 3 inch | |
| --- | --- |
| Signal-to-ground ratio = 0 | Eye height = 70% Jitter = 89.4 ps Overshoot = 83 mV |
| Signal-to-ground ratio = 1 | Eye height = 79% Jitter = 32.4 ps Overshoot = 36 mV |

As shown in Table 1, the length of the signal line of the data bus 13 is 3 inches. The data rate, the peak-to-peak voltage (Vpp), and the data bus 13 are provided by the driver 11, and the signal-to-ground ratio is 2.4 Gbps, 400 mV and 0, respectively. Before the signal output from the driver 11 has not been transmitted to the receiver 12, the eye height, the jitter, and the overshoot measured from the signal line of the data bus 13 by the detector are 70%, 89.4 picoseconds (ps), and 83 mV, respectively. When the signal-to-ground ratio of the data bus 13 set by the driver 11 is adjusted to 1, the eye height, the jitter, and the overshoot detected from the signal line of the data bus 13 by the detector 16 are 79%, 32.4 ps and 36 mV, respectively.

In one embodiment, when the driver 11 transmits data to the receiver 12 through the data bus 13, the detector 16 is configured to detect the current signal quality parameter of the data bus 13 and the detected current signal quality parameter is transmitted to the driver 11, and then the driver 11 is used to determine whether or not the current signal quality parameter of the data bus 13 meets the specification requirements. The current signal quality parameters are, for example, the current eye height, the current bit error rate, the current jitter, the current rising time, the current falling time, the current overshoot/undershoot, or a combination thereof. When the current signal quality parameter meets the specification requirements, the current signal-to-ground ratio of the data bus 13 is not reconfigured. When the current signal quality parameter does not meet the specification requirements, the driver 11 reconfigures the current signal to the ground ratio of the data bus 13. When the current signal-to-ground ratio of the data bus 13 is reconfigured, at least one signal line for transmitting the low voltage level signal is disposed between any two signal lines in the data bus 13 for transmitting data.

Figure 2:
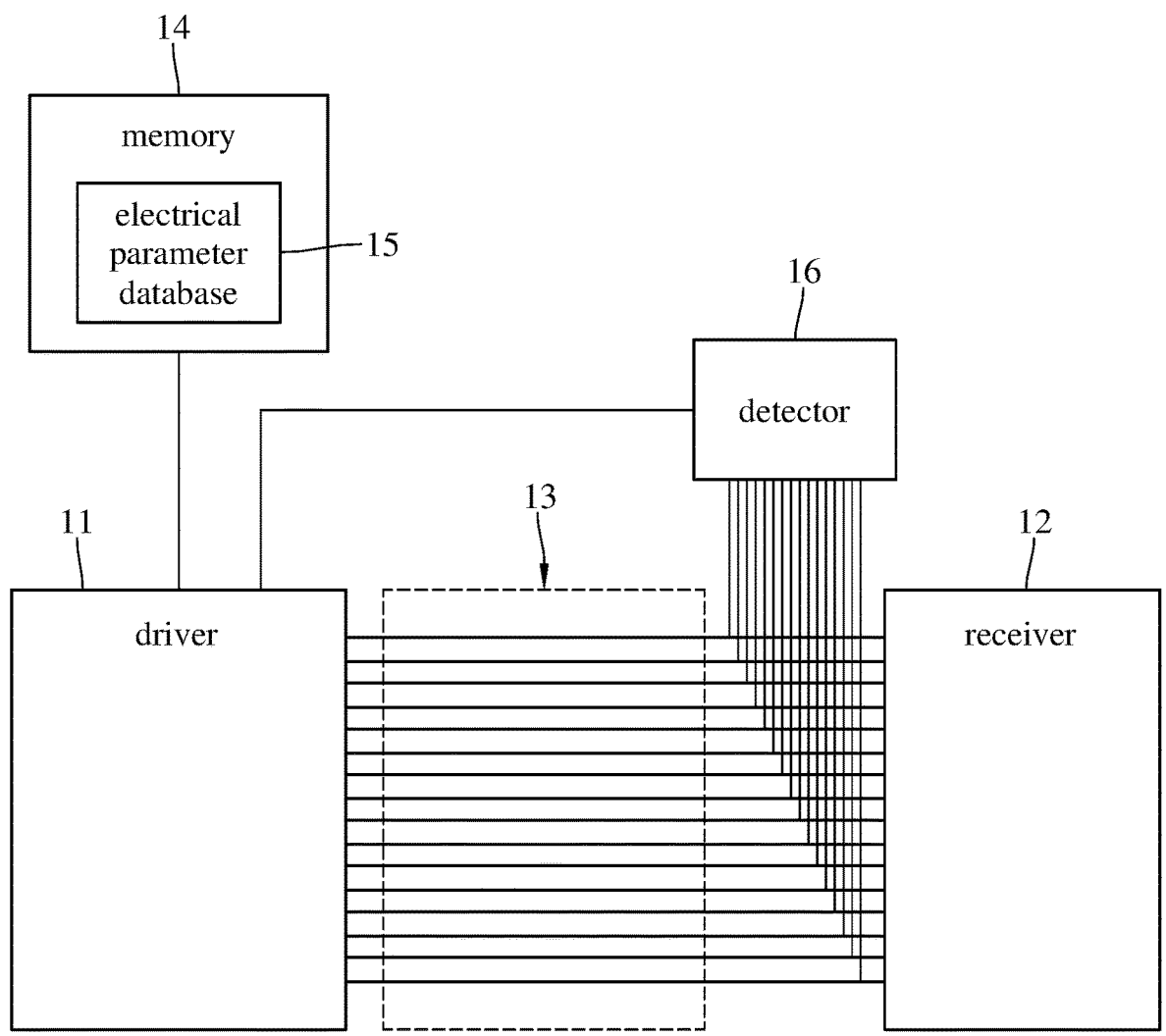
FIG. 2 is a functional block diagram of the reconfigurable data bus system according to a second embodiment of the present invention.

FIG. 2 is a functional block diagram of a reconfigurable data bus system according to a second embodiment of the present invention. The difference between FIG. 2 and FIG. 1 is that the memory 14 shown in the FIG. 2 is not an internal component of the driver 11, but a memory that is independently disposed on the circuit substrate, and the memory 14 shown in the FIG. 2 is electrically connected to the driver 11.

Figure 3:
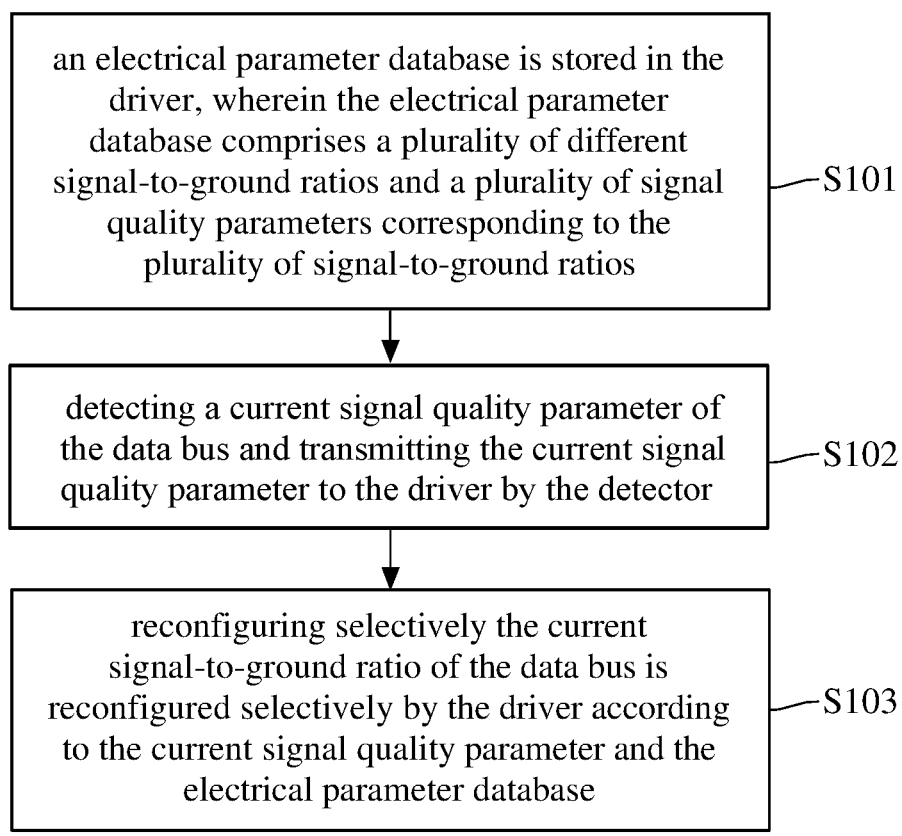
FIG. 3 is a flow chart shown by the method of reconfiguring a data bus according to the first embodiment of the present invention.

FIG. 3 is a flow chart shown by the method of reconfiguring a data bus according to the first embodiment of the present invention. As shown in FIG. 3, in step S101, an electrical parameter database 15 is stored in the driver 11, wherein the electrical parameter database 15 comprises a plurality of different signal-to-ground ratios and a plurality of signal quality parameters corresponding to the plurality of signal-to-ground ratios; in step S102, detecting a current signal quality parameter of the data bus 13 and transmitting the current signal quality parameter to the driver 11 by the detector 16. In step S103, reconfiguring selectively the current signal-to-ground ratio of the data bus is reconfigured selectively by the driver according to the current signal quality parameter and the electrical parameter database.

Figure 4:
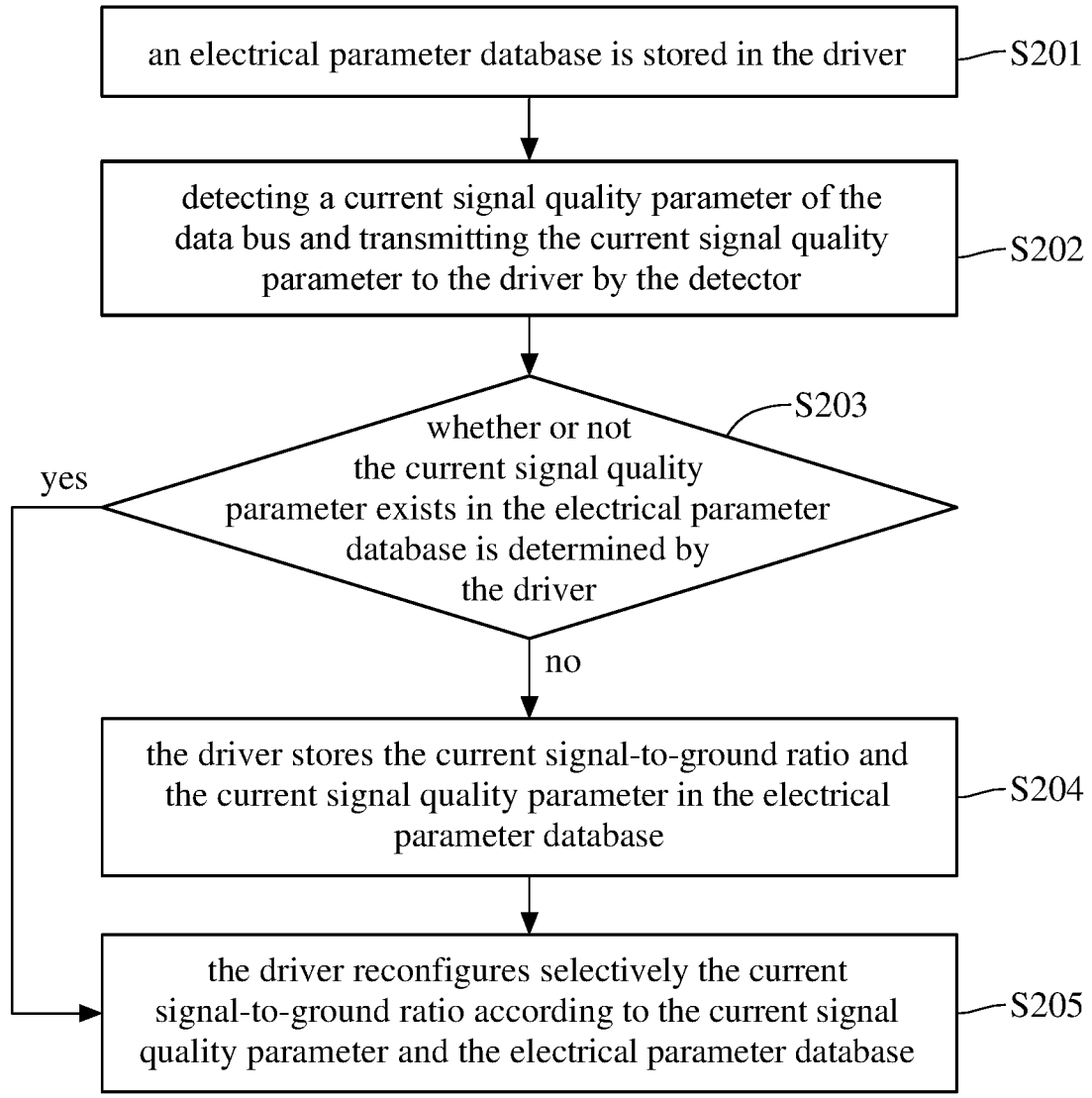
FIG. 4 is a flow chart showing the method of reconfiguring a data bus according to a second embodiment of the present invention.

FIG. 4 is a flow chart shown by the method of reconfiguring a data bus according to the second embodiment of the present invention. As shown in FIG. 4, in step S201, an electrical parameter database 15 is stored in the driver 11. In step S202, detecting a current signal quality parameter of the data bus 13 and transmitting the current signal quality parameter to the driver 11 by the detector 16. In step S203, whether or not the current signal quality parameter exists in the electrical parameter database is determined by the driver; if the result of the determination in step S203 is negative, the process proceeds to step S204.

In step S204, the drive 11 stores the current signal-to-ground ratio and the current signal quality parameter in the electrical parameter database 15. After step S204, the process proceeds to step S205. In step S205, the driver 11 reconfigures selectively the current signal-to-ground ratio according to the current signal quality parameter and the electrical parameter database 15. If the result of the determination in step S203 is affirmative, the process proceeds directly to step S205.

Figure 5:
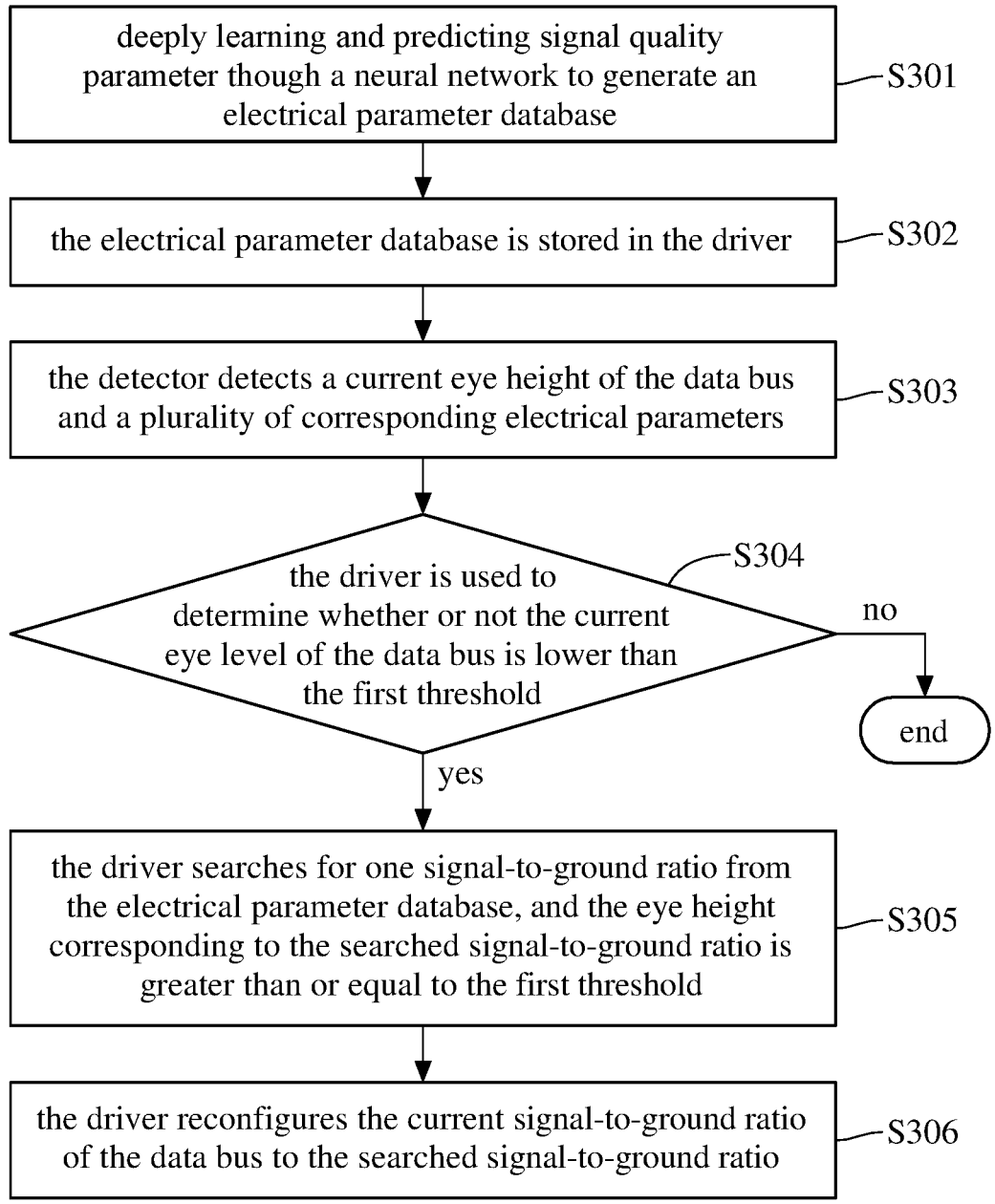
FIG. 5 is a flow chart showing the method of reconfiguring a data bus according to a third embodiment of the present invention.

FIG. 5 is a flow chart showing the method for of reconfiguring a data bus according to a third embodiment of the present invention. As shown in FIG. 5, in step S301, deeply learning and predicting signal quality parameter though a neural network to generate an electrical parameter database 15, wherein the neural network is, but not limited to a deep neural network or a reverse neural network. In detailed, for example, 10 sets of training data can be sampled to train a neural network, and 10 training data have 10 different data transmission rates. 10 different data transmission rates are used to sample 10 equal points of a range of the data transmission rate (for example, 0-30 Gbps). Each set of training data also includes a plurality of different signal-to-ground ratios and its corresponding signal quality parameters, such as an eye height, a jitter, a rising time, a falling time, an overshoot/undershoot, or a combination thereof. After the neural network is trained through the 10 training data, even if the electrical parameter data different from the training data is input to an input layer of the neural network, the neural network can accurately estimate its corresponding signal quality parameters and the corresponding signal quality parameters is output by an output layer of the neural network according to the received electrical parameter data. Then, 100 sets of test data are used to test the neural network. The 100 sets of test data have 100 different data transmission rates, respectively, and the 100 different data transmission rates are used to sample 100 aliquots of a range of the data transmission rate (for example, 0 to 50 Gbps). Each set of test data also includes a number of different signal lines. After 100 sets of test data are sequentially input to the input layer of the neural network, the output layer of the neural network can output 100 signal quality parameters in sequence. During the test, the input parameter of the neural network and the electrical parameter data of the output layer are retrieved to generate the electrical parameter database 15. It can be seen that through the trained neural network, more sets of electrical parameter data than the training data can be predicted.

As shown in FIG. 5, in step S302, the electrical parameter database 15 provided by the deep neural network is stored in the memory 14 in the driver 11. In step S303, the detector 16 detects a current eye height of the data bus 13 and a plurality of corresponding electrical parameters, such as a current data transmission rate, a current signal-to-ground ratio, and a current bit error rate, a current jitter, a current rising time, a current falling time, and a current overshoot/undershoot, but not limited thereto this. In step S304, the driver 11 is used to determine whether or not the current eye level of the data bus 13 is lower than the first threshold (for example, 60%). If the current eye level of the data bus 13 is lower than the first threshold, step S305 is performed. If the current eye height of the data bus 13 is greater than or equal to the first threshold, the current signal-to-ground ratio of the data bus 13 is not reconfigured, that is, the method ends.

In step S305, the driver 11 searches for one signal-to-ground ratio from the electrical parameter database 15, and the eye height corresponding to the searched signal-to-ground ratio is greater than or equal to the first threshold. In step S306, the driver 11 reconfigures the current signal-to-ground ratio of the data bus 13 to the searched signal-to-ground ratio. In detailed, if the current eye height of the detected data bus 13 is 38% and lower than 60% (the first threshold), the driver 11 searches the electrical parameter database 15. When there are four values of signal-to-ground ratio in the electrical parameter database 15 that are greater than or equal to 60%, the signal driving device 11 can select one of the four values of signal-to-ground ratio to reconfigure the current signal-to-ground ratio of the data bus 13.

Figure 6:
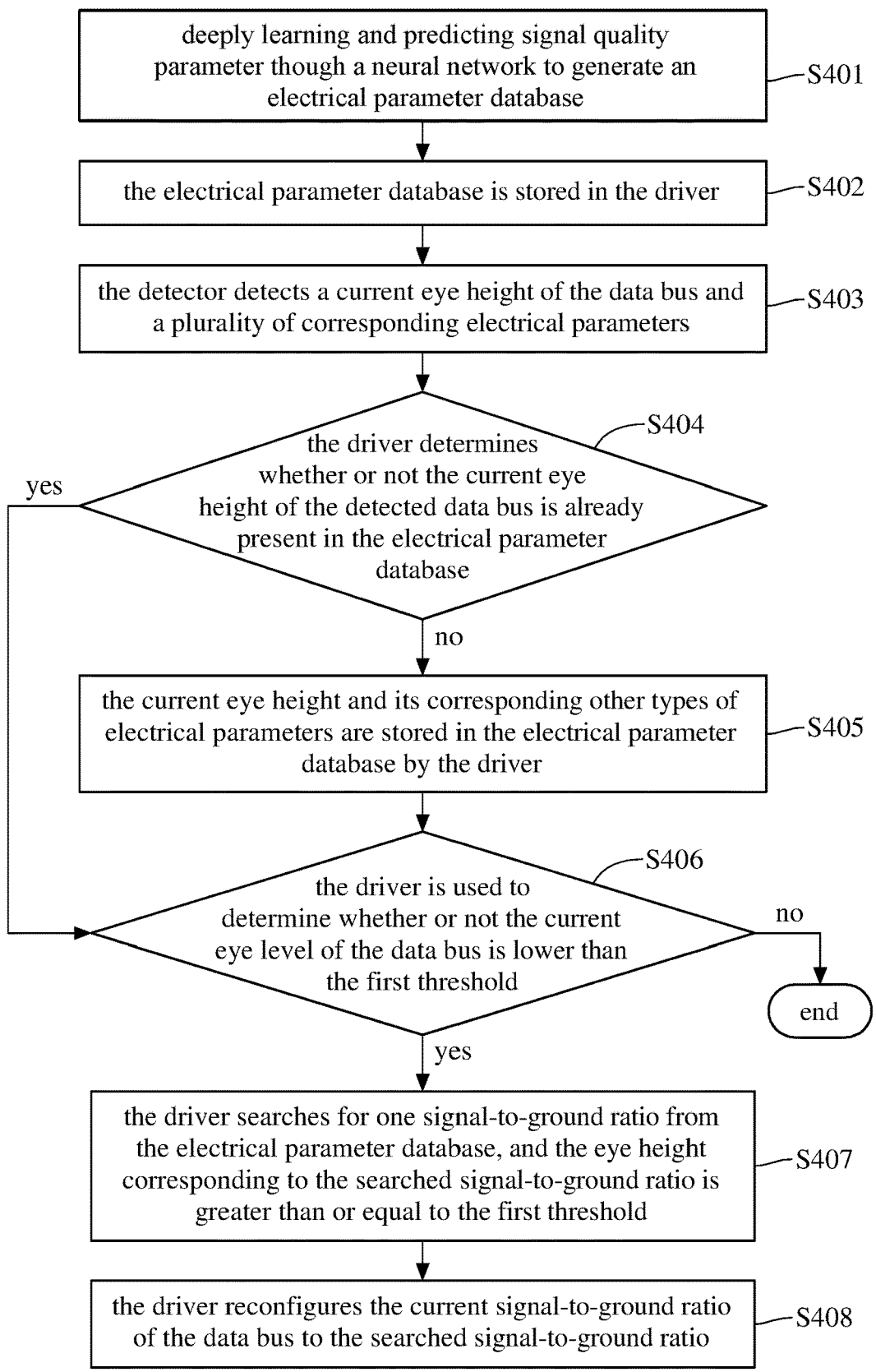
FIG. 6 is a flow chart of the method of reconfiguring a data bus according to the fourth embodiment of the present invention.

FIG. 6 is a flow chart showing the method for of reconfiguring a data bus according to a fourth embodiment of the present invention. Referring to FIG. 5 and FIG. 6 together, steps S401 to S403 and steps S406 to S408 are substantially the same as steps S301 to S303 and steps S304 to S306. Compared with the third embodiment, the method of reconfiguring a data bus of the fourth embodiment shown in FIG. 6 further includes an update judgment mechanism of the parameter database 15. As shown in FIG. 6, in step S404, the driver 11 determines whether or not the current eye height of the detected data bus 13 is already present in the electrical parameter database 15. If the current eye height is already present in the electrical parameter database 15, updating the electrical parameter database 15 is not executed and step S406 is performed. If the current eye height of the data bus 13 does not exist in the electrical parameter database 15, step S405 is performed. In step S405, the current eye height and its corresponding other types of electrical parameters are stored in the electrical parameter database 15 by the driver 11. For example, the current eye height and its corresponding current data transmission rate, the current signal-to-ground ratio, the current jitter, the current rising time, the current falling time, and the current overshoot/current undershoot are stored in the electrical parameter database 15, but not limited thereto.

Figure 7:
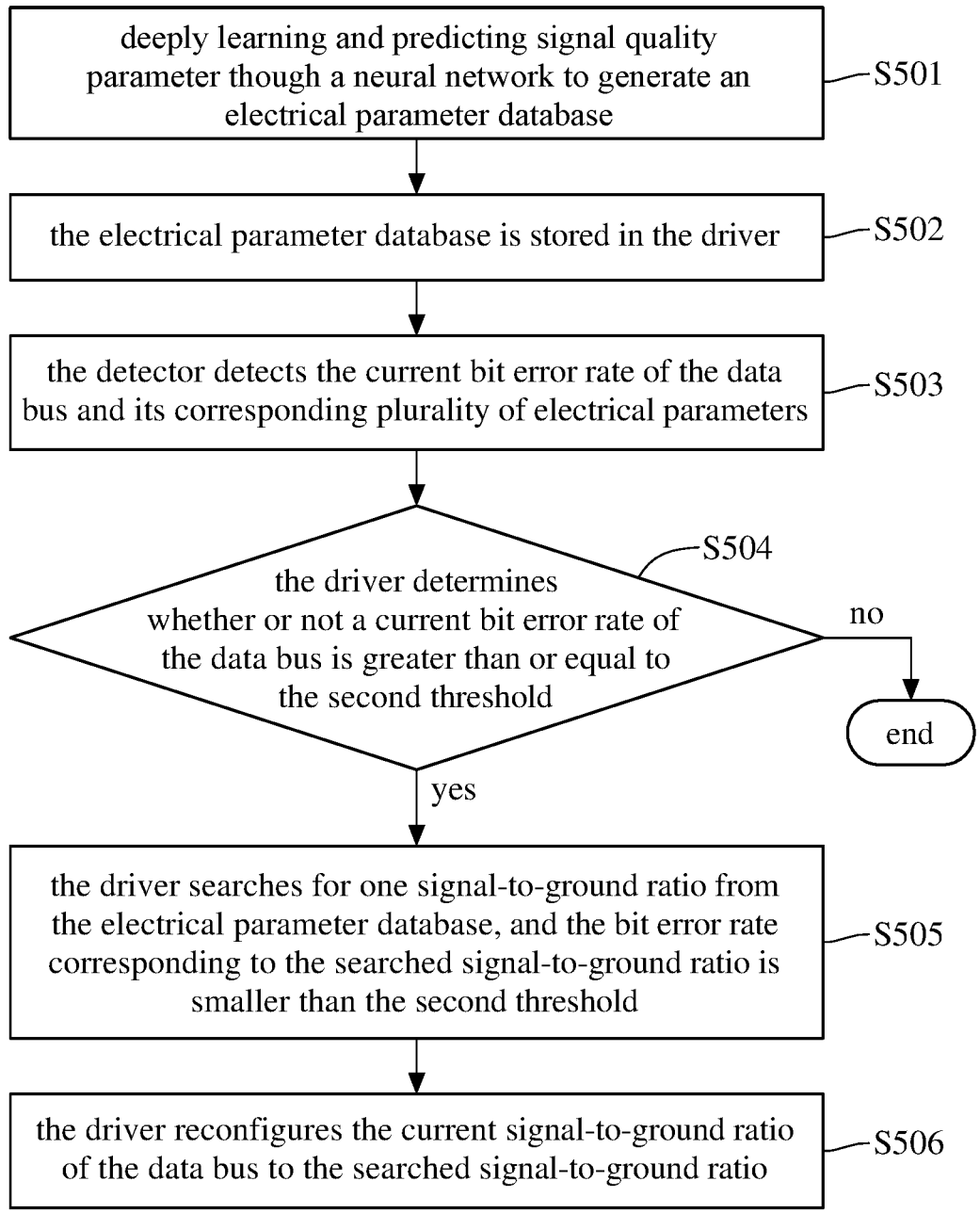
FIG. 7 is a flow chart of the method of reconfiguring a data bus according to the fifth embodiment of the present invention.

FIG. 7 is a flow chart showing a method of reconfiguring a data bus according to a fifth embodiment of the present invention. As shown in FIG. 5, steps S501 to S502 are the same as steps S301 to S302, respectively. In step S503, the detector 16 detects the current bit error rate of the data bus 13 and its corresponding plurality of electrical parameters. In step S504, the driver 11 determines whether or not a current bit error rate of the data bus 13 is greater than or equal to the second threshold. If the current bit error rate of the data bus 13 is greater than or equal to the second threshold, step S505 is performed. If the current bit error rate of the data bus 13 is less than the second threshold, the method ends.

In step S505, the driver 11 searches for one signal-to-ground ratio from the electrical parameter database 15, and the bit error rate corresponding to the searched signal-to-ground ratio is smaller than the second threshold. In step S506, the driver 11 reconfigures the current signal-to-ground ratio of the data bus 13 to the searched signal-to-ground ratio.

Figure 8:
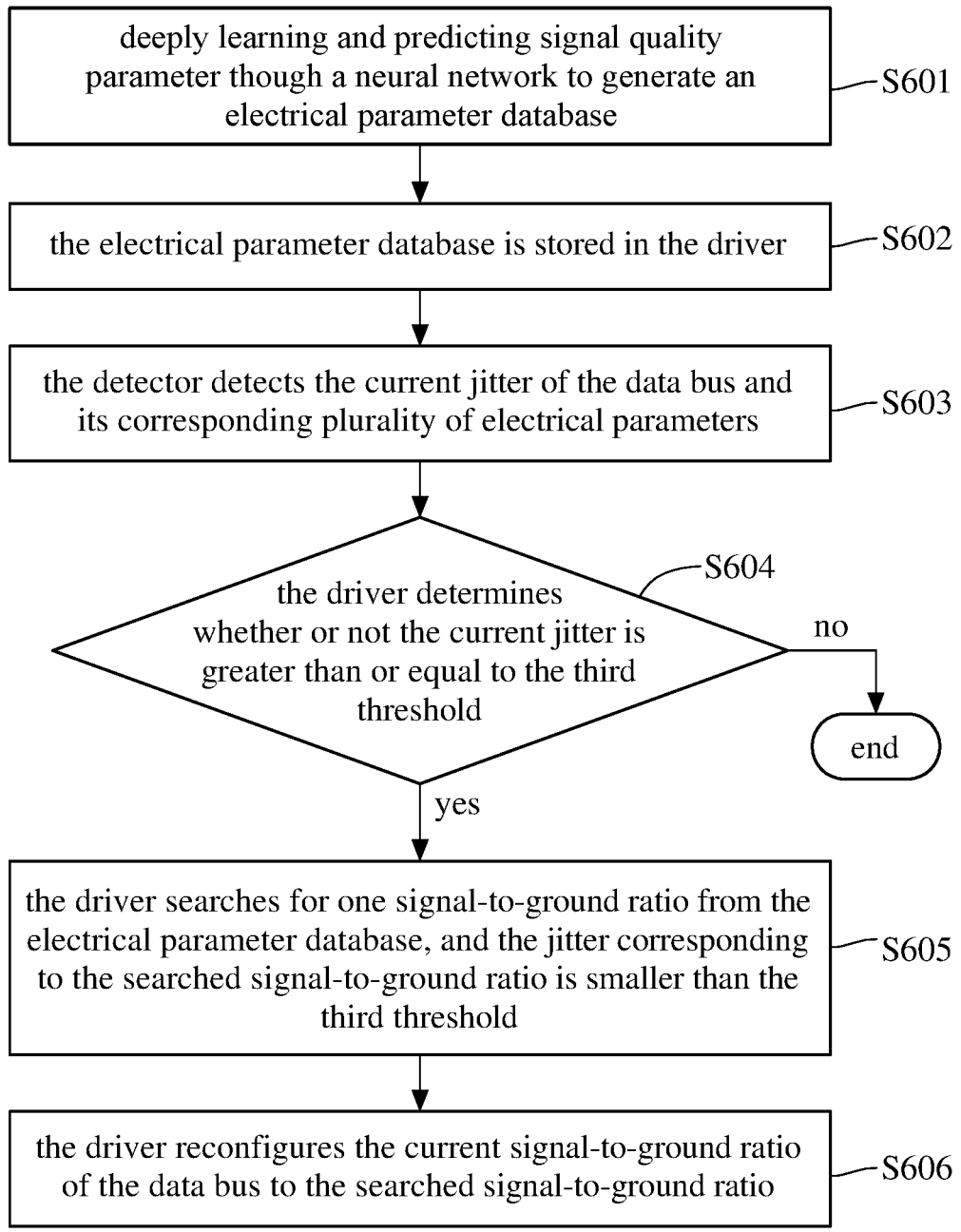
FIG. 8 is a flow chart of the method of reconfiguring a data bus according to the sixth embodiment of the present invention.

FIG. 8 is a flow chart showing a method of reconfiguring a data bus according to a sixth embodiment of the present invention. As shown in FIG. 6, steps S601 to S602 are the same as steps S301 to S302, respectively. In step S603, the detector 16 detects the current jitter of the data bus 13 and its corresponding plurality of electrical parameters. In step S604, the driver 11 determines whether or not the current jitter is greater than or equal to the third threshold. If the current jitter of the data bus 13 is greater than or equal to a third threshold, step S605 is performed. If the current jitter of the data bus 13 is less than the third threshold, the method ends. In step S605, the driver 11 searches for one signal-to-ground ratio from the electrical parameter database 15, and the jitter corresponding to the searched signal-to-ground ratio is smaller than the third threshold. In step S606, the driver 11 reconfigures the current signal-to-ground ratio of the data bus 13 to the searched signal-to-ground ratio.

In other embodiments, the method of reconfiguring a data bus disclosed in FIG. 7 and FIG. 8 may also be combined with the update judgment mechanism of the electrical parameter database 15 disclosed in FIG. 6.

Figure 9A:
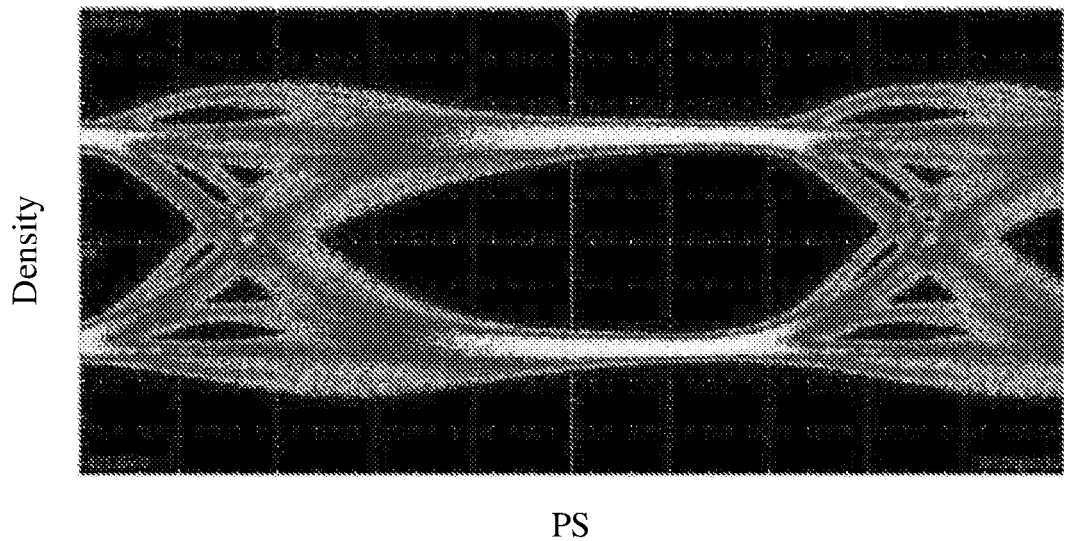
FIG. 9A is an eye height according to a first data transmission rate of the data bus and a first signal-to-ground ratio.
Figure 9B:
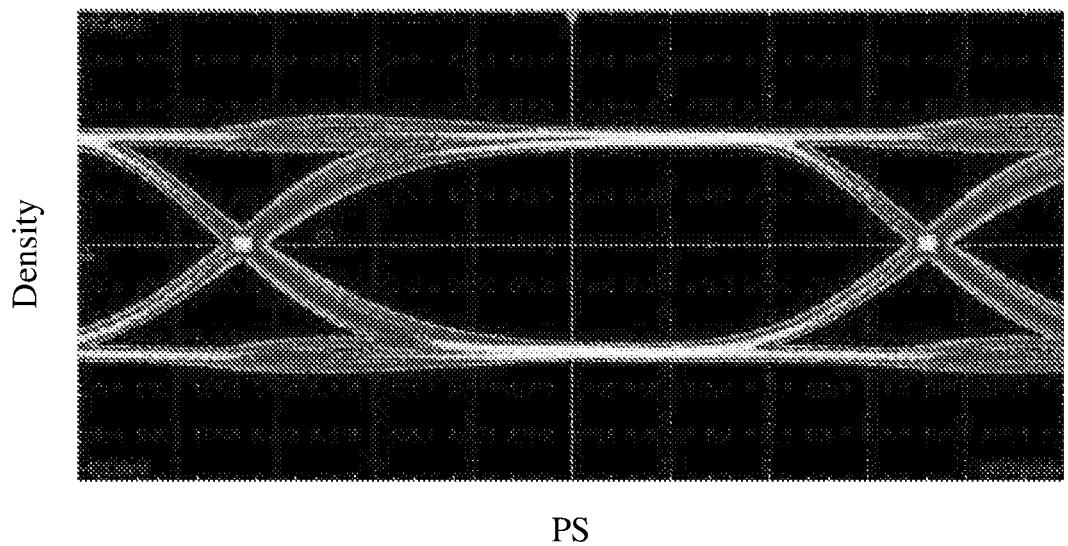
FIG. 9B is an eye height according to the first data transmission rate of the data bus and a second signal-to-ground ratio.

FIG. 9A is an eye height according to a first data transmission rate of the data bus and a first signal-to-ground ratio, and FIG. 9B is an eye height according to the first data transmission rate of the data bus and a second signal-to-ground ratio. As shown in FIG. 9A, the length of the signal line of the data bus 13 is set to 3 inches, and the data transmission rate set by the driver 11, the peak-to-peak voltage, and the signal-to-ground ratio of the data bus 13 are respectively 2.4 Gbps, 400 mV and 0. Under the above conditions, the detector 16 measures the eye height from the signal line of the data bus 13 for transmitting data by 70%, the jitter by 89.4 ps, and the overshoot to be greater than 80 mV. As shown in FIG. 9B, the data transmission rate, the operating voltage, and the signal line length are set to the same value as in FIG. 9A. Only when a second signal-to-ground ratio is changed to 1, the eye height measured by the detector 16 is 79%, the jitter is 32.4 ps, and the overshoot is less than 40 mV. It can be seen that adjusting the signal-to-ground ratio of the data bus 13 can indeed improve the signal quality.

Figure 10A:
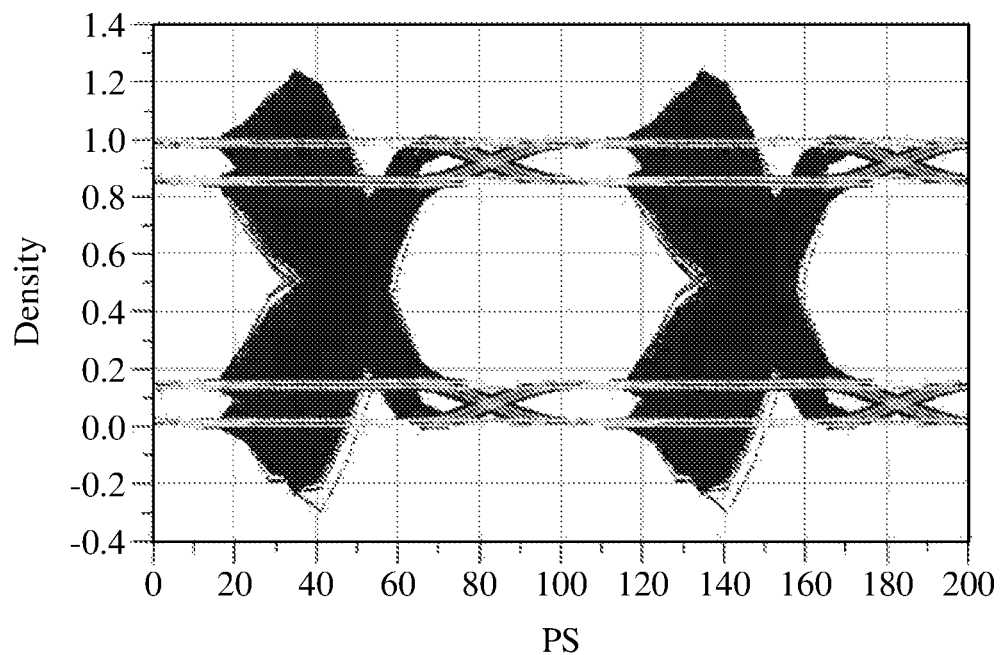
FIG. 10A is an eye height according to a second data transmission rate of the data bus and the first signal-to-ground ratio.
Figure 10B:
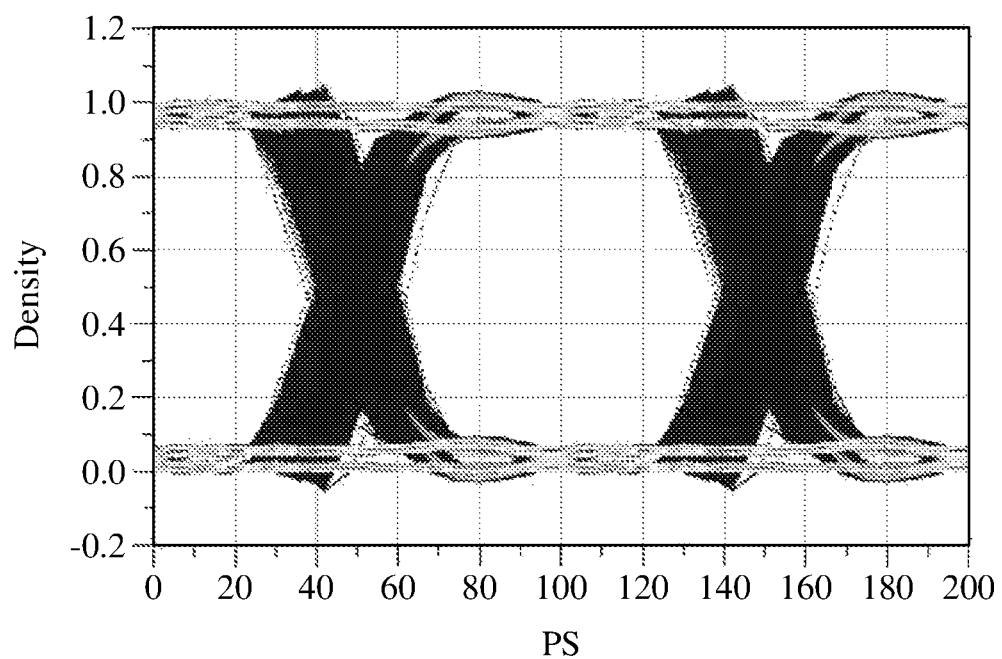
FIG. 10B is an eye height according to the second data transmission rate of the data bus and the second signal-to-ground ratio.

FIG. 10A is an eye height according to a second data transmission rate of the data bus and the first signal-to-ground ratio. FIG. 10B is an eye height according to the second data transmission rate of the data bus and the second signal-to-ground ratio. As shown in FIG. 10A, the eye height detected by the detector 16 under the condition that the data transmission rate is 10 Gbps, the peak-to-peak voltage is 1 V, the signal-to-ground ratio is 0, and the signal line length is 10 mm, the eye height detected by the detector is 68%. As shown in FIG. 10B, the data transmission rate, the operating voltage, and the signal line length are set to the same value as in FIG. 8A. Only when the signal-to-ground ratio is changed to 1, the eye height detected by the detector 16 is 84%. It can be seen that when the data transmission rate is larger, the improvement of the eye height is more obvious.

Generally, the eye height must be greater than or equal to 60%, and the signal will not be distorted. Further, when the data transmission rate set by the driver 11 is larger, the eye height is lower. In the past, in order to maintain signal quality, the value of the data transmission rate must be lowered. However, through the reconfigurable data bus system and the data bus reorganization method disclosed in the present invention, the current signal-to-ground ratio of the data bus can be automatically adjusted according to the required specifications. When the data transmission rate is larger, the improvement of the eye height is also greater. In this way, even if the driver 11 sets a higher data transmission rate, the signal quality can be considered.

In summary, in the past, in order to reduce the crosstalk effect between adjacent signal lines, a grounding conductor is usually added between adjacent signal lines. However, when the ground wire is added to the vicinity of the signal line, the bandwidth of the data bus is limited. Therefore, when the required specification changes, the number of grounding conductors and layout area must be changed again, which is very inconvenient and time-consuming in design. The reconfigurable data bus system and the method thereof disclosed in the present invention, which can automatically adjust the number of signal lines for transmitting the low voltage level signal and the number of signal lines for transmitting data in the data bus according to different required specifications, not only reduce the crosstalk effect between adjacent signal lines, but also do not require changes to the hardware circuit. As a result, it is more flexible and reduces the time it takes to design, and achieves greater data transfer rates and better signal quality.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A reconfigurable data bus system, comprising:
a driver, storing an electrical parameter database, the electrical parameter database comprises a plurality of different signal-to-ground ratios and a plurality of signal quality parameters corresponding to the plurality of different signal-to-ground ratios;
a receiver;
a data bus, including a plurality of signal lines electrically connected between the driver and the receiver; and
a detector, electrically connected to the data bus and the driver, the detector is configured to detect a current signal quality parameter of the data bus and transmit the current signal quality parameter to the driver;
wherein each of the signal-to-ground ratios is defined as a ratio of the number of a part of the signal lines for transmitting data in the data bus to the number of another part of the signal lines for transmitting low voltage level signals, and the number of the part of the signal lines for transmitting data and the number of the another part of the signal lines for transmitting low voltage level signals are set by the driver, and the driver is selectively reconfigured a current signal-to-ground ratio of the data bus according to the current signal quality parameter and the electrical parameter database.

2. The reconfigurable data bus system according to claim 1, wherein when the driver reconfigures the current signal-to-ground ratio of the data bus, at least one signal line used to transmit the low voltage level signal is disposed between each two of signal lines used to transmit data.

3. The reconfigurable data bus system according to claim 1, wherein the plurality of signal quality parameters are a plurality of different eye heights, and the electrical parameter database further comprises a plurality of different data transfer rates corresponding the plurality of eye heights.

4. The reconfigurable data bus system according to claim 1, wherein the signal quality parameters are a plurality of different bit error rates, and the electrical parameter database further comprises a plurality of different data transfer rates corresponding the plurality of different bit error rates.

5. The reconfigurable data bus system according to claim 1, wherein the signal quality parameters are a plurality of different jitters, and the electrical parameter database further comprises a plurality of different data transfer rates corresponding to the plurality of jitters.

6. A method of reconfiguring a data bus, wherein the data bus includes a plurality of signal lines electrically connected between a driver and a receiver, comprising:
   storing an electrical parameter database in the driver, wherein the electrical parameter database comprises a plurality of different signal-to-ground ratios and a plurality of signal quality parameters corresponding to the plurality of signal-to-ground ratios, wherein each of the signal-to-ground ratios is defined as a ratio of the number of a part of the signal lines for transmitting data in the data bus to the number of another part of the signal lines for transmitting low voltage level signals, and the number of the part of the signal lines for transmitting data and the number of the another part of the signal lines for transmitting low voltage level signals are set by the driver;
   detecting a current signal quality parameter of the data bus and transmitting the current signal quality parameter to the driver by a detector; and
   reconfiguring selectively a current signal-to-ground ratio of the data bus by the driver according to the current signal quality parameter and the electrical parameter database.

7. The method according to claim 6, wherein the reconfiguring selectively the current signal-to-ground ratio of the data bus by the driver according to the current signal quality parameter and the electrical parameter database, further comprises:
   determining whether or not the current signal quality parameter is lower than a first threshold;
   if the current signal quality parameter is lower than the first threshold, searching one of the signal-to-ground ratios from the electrical parameter database, and the signal quality parameter corresponding to the searched one being greater or equal to the first threshold; and
   reconfiguring the current signal-to-ground ratio as the searched one.

8. The method according to claim 6, wherein the signal quality parameters are a plurality of different eye heights, the current signal quality parameter is a current eye height, and the electrical parameter database further comprises a plurality of different data transfer rates corresponding the plurality of different eye heights.

9. The method according to claim 6, wherein the reconfiguring selectively the current signal-to-ground ratio of the data bus by the driver according to the current signal quality parameter and the electrical parameter database further comprises:
   determining whether or not the current signal quality parameter is higher than a second threshold;
   if the current signal quality parameter is higher than the second threshold, searching one of the signal-to-ground ratios from the electrical parameter database, and the signal quality parameter corresponding to the searched one being lower or equal to the second threshold; and
   reconfiguring the current signal-to-ground ratio as the searched one.

10. The method according to claim 6, wherein the plurality of signal quality parameters is a plurality of different bit error rates, and the electrical parameter database further comprises a plurality of different data transfer rates corresponding the plurality of bit error rates.

11. The method according to claim 6, wherein the reconfiguring selectively the current signal-to-ground ratio of the data bus by the driver according to the current signal quality parameter and the electrical parameter database further comprises:
   determining whether or not the current signal quality parameter is higher than a third threshold;
   if the current signal quality parameter is higher than the third threshold, searching one of the signal-to-ground ratios from the electrical parameter database, and the signal quality parameter corresponding to the searched one being lower or equal to the third threshold; and
   reconfiguring the current signal-to-ground ratio as the searched one.

12. The method according to claim 6, wherein the signal quality parameters are a plurality of different jitters, and the electrical parameter database further comprises a plurality of different data transfer rates corresponding to the plurality of jitters.

13. The method according to claim 6, wherein before the driver selectively reconfigures the current signal-to-ground ratio, and after detecting the current signal quality parameter by the driver, the method further comprises:
   determining, by the driver, whether or not the current signal quality parameter exists in the electrical parameter database; and
   if the current parameter quality parameter does not exist in the electrical parameter database, storing the current signal quality parameter and the current signal-to-ground ratio in the electrical parameter database.

14. The method according to claim 13, wherein the current signal quality parameter is a current eye height, a current bit error rate, or a current jitter.

15. The method according to claim 6, wherein the method further comprises:
   generating the electrical parameter database through a neural network learning signal quality parameters before storing the electrical parameter database in the driver.

16. The method according to claim 6, wherein before the driver selectively reconfigures the current signal-to-ground ratio, and after detecting the current signal quality parameter by the driver, the method further comprises:
   determining, by the driver, whether or not the current signal quality parameter exists in the electrical parameter database; and
   if the current parameter quality parameter does not exist in the electrical parameter database, storing the current signal quality parameter and the current signal-to-ground ratio in the electrical parameter database.

17. The method according to claim 16, wherein the current signal quality parameter is a current eye height, a current bit error rate, or a current jitter.

18. The method according to claim 6, wherein the method further comprises:
   generating the electrical parameter database through a neural network learning signal quality parameters before storing the electrical parameter database in the driver.

* * * * *